(12) United States Patent
Prigogin et al.

(10) Patent No.: US 7,519,566 B2
(45) Date of Patent: Apr. 14, 2009

(54) METHOD AND APPARATUS FOR AUTOMATICALLY AND CONTINUOUSLY UPDATING PREDICTION MODELS IN REAL TIME BASED ON DATA MINING

(75) Inventors: Sergey A. Prigogin, Foster City, CA (US); Michel Adar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 308 days.

(21) Appl. No.: 10/980,421

(22) Filed: Nov. 2, 2004

(65) Prior Publication Data

US 2005/0177414 A1 Aug. 11, 2005

Related U.S. Application Data

(60) Provisional application No. 60/544,192, filed on Feb. 11, 2004.

(51) Int. Cl.
*G06E 1/00* (2006.01)
(52) U.S. Cl. .......................... 706/21; 707/100
(58) Field of Classification Search ............ 706/21; 705/10; 707/100
See application file for complete search history.

(56) References Cited

U.S. PATENT DOCUMENTS

| | | | | |
|---|---|---|---|---|
| 5,970,482 | A * | 10/1999 | Pham et al. | 706/16 |
| 6,236,978 | B1 * | 5/2001 | Tuzhilin | 705/26 |
| 6,456,991 | B1 * | 9/2002 | Srinivasa et al. | 706/20 |
| 6,836,773 | B2 * | 12/2004 | Tamayo et al. | 707/6 |
| 7,257,537 | B2 * | 8/2007 | Ross et al. | 704/270 |
| 2002/0083067 | A1 * | 6/2002 | Tamayo et al. | 707/100 |
| 2004/0103017 | A1 * | 5/2004 | Reed et al. | 705/10 |
| 2004/0249867 | A1 * | 12/2004 | Kraiss et al. | 707/203 |
| 2005/0154687 | A1 * | 7/2005 | Kraiss | 706/12 |

FOREIGN PATENT DOCUMENTS

WO     WO 03/005232 A2 *  1/2003

OTHER PUBLICATIONS

"Data Mining and the Web: Past, Present and Future", M. N. Garofalakis, R. Rastogi, S. Seshadri, K. Shim, Proceedings of the 2nd international workshop on Web information and data management, 1999, pp. 43-47.*

* cited by examiner

*Primary Examiner*—David R Vincent
*Assistant Examiner*—Mai T Tran
(74) *Attorney, Agent, or Firm*—Townsend and Townsend and Crew LLP

(57) ABSTRACT

Disclosed are methods and apparatus for updating at least one prediction model for use by at least one interactive server. Each interactive server performs a plurality of actions in the context of a plurality of input attributes values of an input dataset wherein the actions are selected based on each prediction model. contextual data are automatically and continually obtained from the interactive server as it performs the plurality of actions. A learning model is automatically and continually updated based on all of the obtained contextual data. An updated prediction model and a prediction of a probability of an outcome using the updated prediction model are generated. A prediction is generated and an action of the plurality of actions based on the prediction is selected. The selection action is performed.

43 Claims, 7 Drawing Sheets

METHOD AND APPARATUS FOR AUTOMATICALLY AND CONTINUOUSLY UPDATING PREDICTION MODELS IN REAL TIME BASED ON DATA MINING

CROSS REFERENCE TO RELATED PATENT APPLICATION

This application claims priority of U.S. Provisional Patent Application No. 60/544,192 filed 11 Feb. 2004 by Sergey A. Prigogin et al., which application is incorporated herein by reference in its entirety for all purposes. This application is related to concurrently filed U.S. patent application Ser. No.10/980,440, entitled "Method and Apparatus for Optimizing the Results Produced by a Prediction Model" by Michel Adar et al., which application is incorporated by reference herein in its entirety for all purposes.

BACKGROUND OF THE INVENTION

The present invention relates to apparatus and methods for modeling interactions between various entities, such as a customer and a telephone call center. More specifically, it relates to mechanisms for predicting the results of particular decisions that each specify one or more actions to be performed with respect to a particular entity or a subset of entities.

Prediction modeling is generally used to predict the outcome of numerous decisions which could be implemented. In a most simplistic example, a prediction model may predict the likelihood (or probability) of a particular result or outcome occurring if a particular action was performed (e.g., a particular decision is carried out) under one or more specific conditions. In a more complex scenario, a prediction model may predict the probabilities of a plurality of outcomes for a plurality of actions being performed under various conditions.

In a specific application, prediction modeling may be used to decide which specific interactions are to be taken by a company's service or product sales center (e.g., website or telephone call center) when a customer is interacting with such center. The prediction modeling helps the company select an interaction that is likely to result in a desirable goal being met. Automated sales centers, for example, typically provide an automated process which attempts to match potential or current customers with desirable products and/or services. In the case of websites, the sales center may be fully automated. In the case of call centers, human customer-service agents in conjunction with automated interactive voice recognition (IVR) processes or agents are often used.

For example, a customer may go to a particular website of a company which specializes in selling automobiles. From the company's perspective, the company may have a goal of maximizing automobile revenue to each customer who interacts with its website or telephone call center. When a customer initially accesses the website or call center, it may be possible to select any number of sales promotions to present to the customer (e.g., via a web page or communicated by a human sales agent). Prediction models may be used to determine which sale promotion to present to a given customer to more likely achieve the goal of maximizing sales revenue. For instance, it may be determined that a particular type of customer is highly likely to buy a particular type of automobile if presented with a sales presentation for such item. In another example, another goal may be to maximize customer satisfaction, and the prediction model may determine that a particular customer is likely to be most satisfied if allowed to communicate with a particular service agent or be presented with a particular set of one or more IVR options.

Prediction models have in the past been designed offline. That is, typically a group of experts is set up in the company to attempt to determine which customers are the most likely to buy products or services that they have to sell, how to retain current customers, and what is the best inventory of goods and/or services to provide for different customer groups. In order to perform the modeling tasks, extensive research is often undertaken, including buying expensive reports and surveys from consulting companies and the like.

There has been a recent trend towards the creation of self-learning prediction models. That is, there have been efforts to develop prediction models that do not require the development of preset rules or biases as is required by offline modeling. Self-learning models observe the interactions of customers with the system and adjust themselves accordingly. However, adjustment of the models tends to be data-intensive and, as such, the models typically are not adjusted in real-time. Instead, downtime is typically scheduled to update the models. The downtime is usually done during non-peak hours but still has the potential to inconvenience customers who happen to engage a business during the same period, as well as interfering with revenue generation.

Additionally, the prediction model and execution of such prediction model typically consume a significant amount of processing and storage resources. For example, the prediction model itself may use a large number of inputs which are then correlated together to produce prediction results. While some of the large number of inputs may be relevant and significantly contribute to the prediction results, other inputs are irrelevant to generation of the prediction results. The storage used for storing these irrelevant inputs may be significant and represent an inefficient use of resources. Also, execution of a prediction model that has a large number of irrelevant inputs can consume a significant amount of processing resources. Another problem with executing a prediction model with a large number of statistically insignificant inputs is that such execution contributes to the amount of noise results produced by the prediction model. Thus, it may be difficult to filter the noise results from the important results produced by a prediction model if there is a high number of irrelevant inputs. When a high number of irrelevant inputs are used for running the prediction model, a significant percentage of the processing resources must be used for consideration of the high number of inputs, at the expense of executing algorithms for considering different or alternative action paths which may result in a wider sampling of prediction results to thereby facilitate decision making.

Although the existing prediction models work well in many application, there are continuing efforts to develop improved mechanisms for efficiently updating prediction models while reducing interference with the interactions on which the prediction modeling outcomes are applied. Additionally, it would be preferable to minimize the resource overhead for retaining and executing such prediction models and their plurality of inputs.

SUMMARY OF THE INVENTION

Accordingly, the present invention provides methods and apparatus for updating (i.e., generating or modifying) one or more prediction models that are used to make decisions as to which interactions (such as which automated voice option to present to a person who has contacted an automated telephone service center) to perform under a specified range of input conditions (such as the calling person's profile, which interactions have taken place so far between the call center and the calling person, etc.). In general terms, the present invention provides a feedback mechanism for updating at least one prediction model based on contextual data that is continuously collected during interaction processes (such as various telephone interactions with a telephone service center). The updating of the prediction model includes pruning inputs that are statistically insignificant from the prediction model. The updated and pruned prediction model is provided to at least one interactive server which determines what actions or decisions to implement based on the prediction model. The prediction model is updated in-line with the performing of the actions on the interactive server and collecting of the contextual data from the interactive server. In specific implementations, the contextual data specifies the characteristics of various entities (such as a human caller and an answering automated or human agent) who are interacting with at least one interactive server, the outcomes of the interactions, and the interactions performed with respect to the entities.

In one embodiment, a method of updating at least one prediction model for use by at least one interactive server is disclosed. Each interactive server is configured to perform a plurality of actions in the context of a plurality of input attribute values and these actions are selected based on each prediction model. The method includes the following operations (a) automatically and continually obtaining contextual data from the interactive server as it performs the plurality of actions, wherein the contextual data indicates at least which action was performed, which input attribute values are present for each action that was performed, and which outcome is achieved for each action that was performed; (b) automatically and continually updating a learning model based on all of the obtained contextual data, wherein the learning model is configured to predict a probability of each of a plurality of specific outcomes occurring for each of a plurality of specific actions being performed by the interactive server when specific combinations of one or more input attribute values are present; and (c) automatically and continually pruning one or more values of such input attributes from the learning model to thereby update a prediction model that is usable by the interactive server, whereby the pruning is accomplished so that input attributes values which do not significantly affect the outcomes of the actions being performed are eliminated from being used by the prediction model to predict the plurality of probabilities.

In a specific implementation, the contextual data is obtained from each of a plurality of interactive servers by a centralized model building server, and the learning model is updated and pruned by the centralized model building server to update the prediction model so that it is usable by any of the distributed interactive servers. In another aspect, operations (a) through (c) are performed unsupervised (without human intervention). In yet another implementation, the input attribute values identify one or more attributes of a plurality of contacting entities, one or more attributes of a plurality of answering entities, and time information regarding when specific interactions occur with respect to contacting entities and answering entities. In this implementation, the updating of the learning model is based on counts of each attribute value, as it is present along with each of the other attribute values.

In a specific embodiment, the contacting entities are potential or current customers and the answering entities are sales or service agents in communication with the potential or current customers. In a further aspect, the interactive server is a web server and the sales or service agents include automated agents. In another aspect, the learning model and the prediction model are both updated to predict a probability of whether a particular product will be purchased when a specific offer is presented via one or more web pages to a potential customer having a particular attribute profile. In one embodiment, the learning model and the prediction models are both updated to predict a plurality of probabilities with respect to a plurality of products, a plurality of offers, and a plurality of attribute profiles. In another embodiment, the interactive server is part of a telephone service center. In a further aspect, the telephone service center implements interactive voice recognition (IVR) type actions.

In an alternative embodiment, the learning model and the prediction model are both updated to predict a probability of whether a particular service option will be selected by a customer having a particular attribute profile when such particular service option is presented to such customer. In one feature, the learning model and the prediction models are both updated to predict a plurality of probabilities with respect to a plurality of service options and a plurality of attribute profiles.

In a specific embodiment, a plurality of learning models are updated and pruned to form a plurality of updated prediction models that are usable by the interactive server to implement actions. In a further embodiment, the method includes publishing the prediction model to the interactive server. In yet another embodiment, the one or more input attribute values of the learning model are pruned by (i) determining a plurality of correlations between each of the input attributes and each of the specific outcomes that are predicted by the prediction model, (ii) removing the values of the input attributes that have a correlation that is less than a predetermined threshold, and (iii) removing input attributes that have no remaining values.

In a specific implementation, operations (b) and (c) are performed each time a condition is met, the condition being selected from a group consisting of (i) a predetermined level of contextual data has been obtained, (ii) a predetermined number of actions have been performed, (iii) a predetermine time period has expired, (iv) a number of new input attributes from the collected contextual data has reached a predetermined percentage of a total number of the input attributes or a predetermined minimum number of new input attributes has been reached.

In another embodiment, the invention pertains to a computer system operable to update at least one prediction model for use by at least one interactive server. The computer system includes one or more processors and one or more memory. At least one of the memory and processors are adapted to provide at least some of the above described method operations. In yet a further embodiment, the invention pertains to a computer program product for updating at least one prediction model for use by at least one interactive server. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures that illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
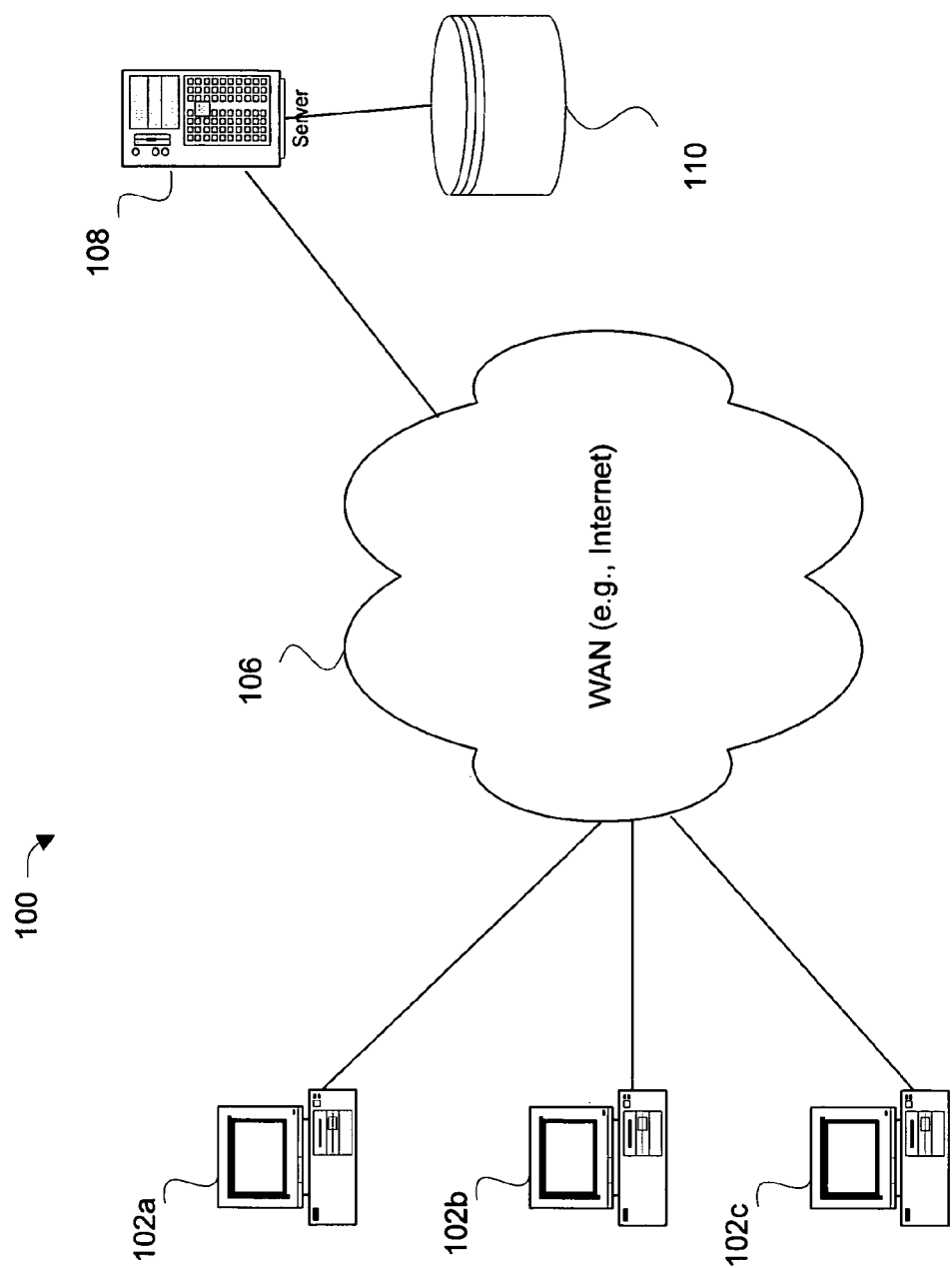
FIG. 1 is a diagrammatic representation of an exemplary first sales channel for which techniques of the present invention may be applied.

FIG. 1 is a diagrammatic representation of an exemplary first sales channel 100 for which techniques of the present invention may be applied. As shown, the sales channel 100 includes a plurality of hosts 102 and a web server 108 which are both coupled to a wide area network (WAN) 106, e.g., the Internet. Any suitable type of entity or user (such as a person or an automated process) may access the web server 108 via host device 102. The server 108 may also be in communication with one or more database 110. The web server 108 may be configured to provide various products and services to various users. For example, the web server 108 may include an on-line store for customers to purchase various products and an on-line service center for providing customers with FAQ's or trouble shooting help regarding their purchased products.

In a sales environment, potential customers on computers 102 or the like access the web server 108 via the Internet 106 or the like. Their experience at the website hosted by web server 108 is dictated or influenced by one or more prediction models running, for example, on the web server 108 and obtained from database 110, for example. The prediction model is preferably self-learning, at least based in part, on the interactions of the potential customers and the website. Information regarding the customers and website interactions is preferably stored in database 110. It should be noted that the computers, network, servers, databases, machines, etc. that are illustrated in FIG. 1 are logical in nature, and some are all of their functionalities can be performed on one or more physical machines, systems, media, etc.

Figure 2:
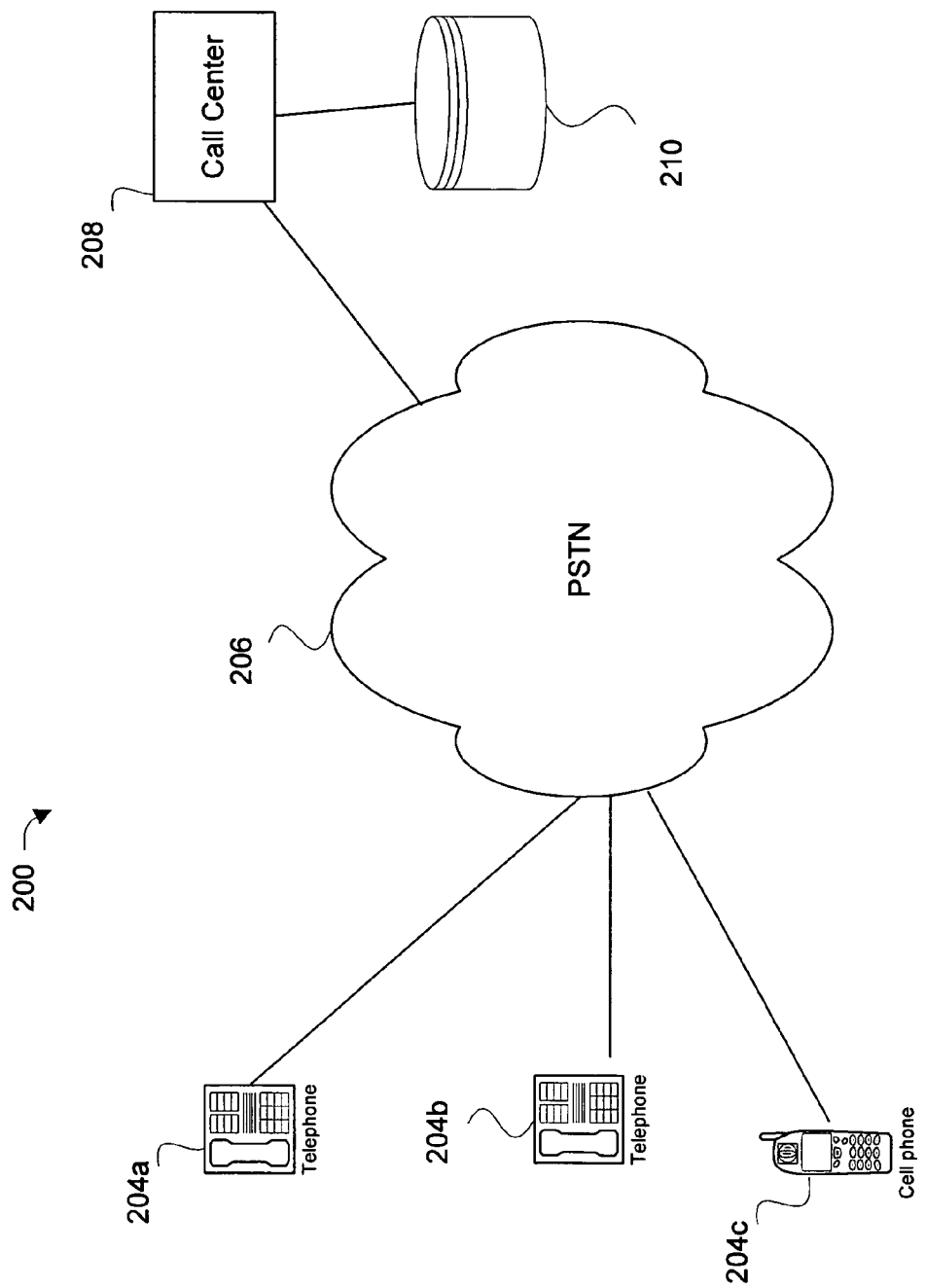
FIG. 2 is a diagrammatic representation of an exemplary second sales channel for which techniques of the present invention may be applied.

FIG. 2 illustrates an exemplary second sales channel 200 which has certain analogies with the exemplary first sales channel 100. In second sales channel 200, users may access call center 208 through individual telephones 204 or the like via a telephone system 206 (public switched telephone network or PSTN) or the like. The call center 208 may maintain a database 210 for essentially the same purposes that the web server 108 of FIG. 1 maintains the database 110 in the first sales channel 100. Users may communicate and interact with agents (human or automated) or an IVR system at the call center 208. Again, the telephones, telephone system, call center, and database, etc., of FIG. 2 are illustrated in a functional form and their actual physical manifestations may differ from implementation to implementation.

Figure 3:
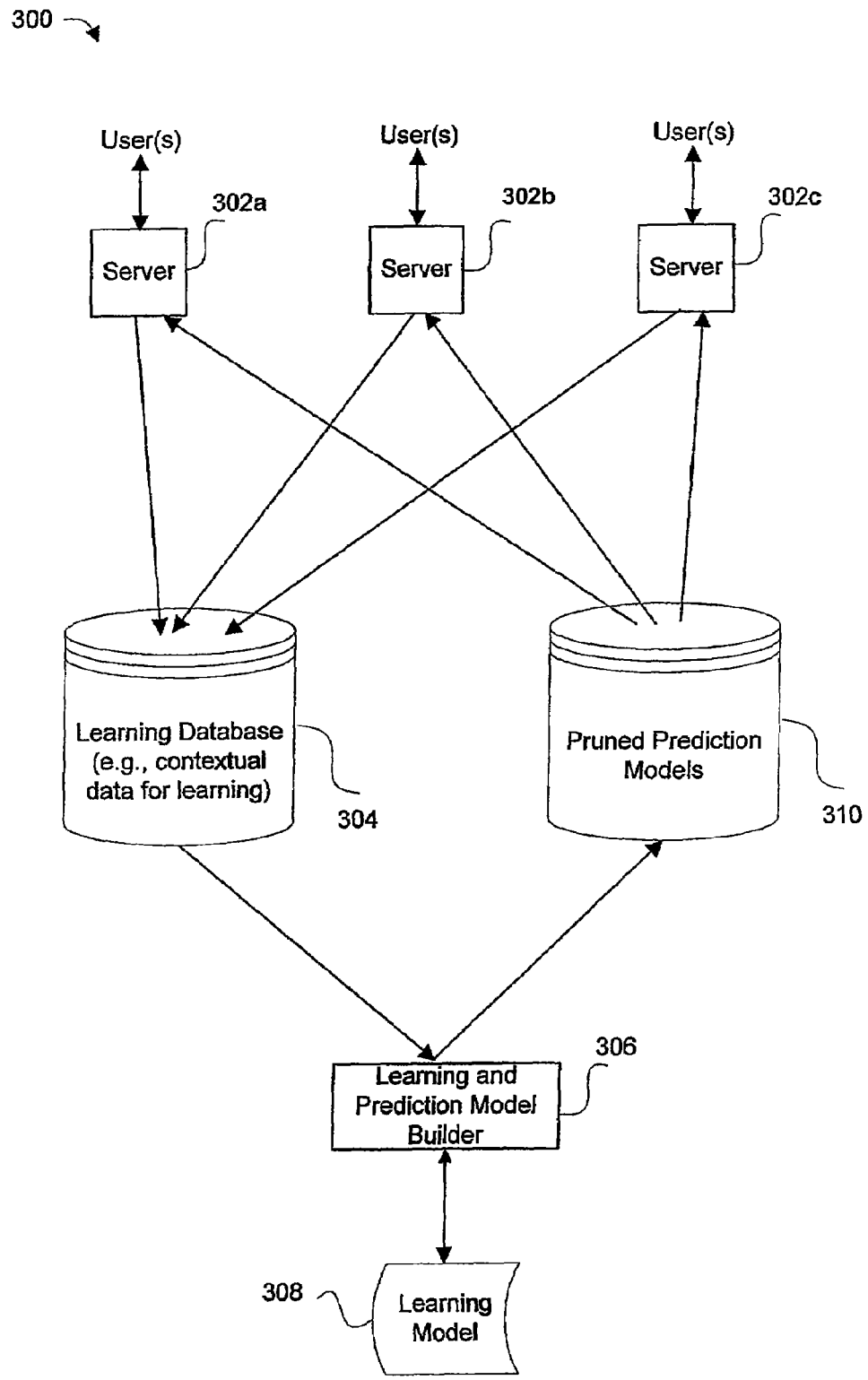
FIG. 3 is a diagram illustrating an exemplary distributed learning system in accordance with an embodiment of the present invention.

FIG. 3 is a diagram illustrating an exemplary distributed learning system 300 in accordance with an embodiment of the present invention. As shown, system 300 includes one or more interactive servers 302(a), 302(b), 302(c), hereinafter referred to as interactive servers 302 or servers 302, a learning database 304, a pruned prediction model repository 310, a learning and prediction model builder server 306, and a learning model 308. The learning system preferably includes a plurality of distributed interactive servers 302 although a single interactive server is also contemplated.

Interactive servers 302 execute one or more prediction models to determine specific transaction paths to follow, such as which web page or automated interactive voice message to present to a particular customer. A single prediction model may be used to predict the probability of a particular outcome or any number of outcomes based on a specific number of input attributes or contextual data and their corresponding values. Contextual data is in the form of a finite set of input factors which are deemed to have an effect on whether a particular goal or outcome is met when particular decisions or events occur. input attributes may include attributes of a contacting entity (such as a potential or current customer), attributes of an answering entity (such as sales or service agent), time information regarding when specific events occur, etc. Alternatively, a plurality of prediction models may be used to determine the probability of a plurality of outcomes. Each single prediction model may be used to predict each single outcome probability. For example, a first prediction model may be used to determine the probabilities of achieving a first outcome when a particular decision (or action plan) is implemented with respect to various customer's with specific characteristics or profiles, and a second prediction model is used to determine the probabilities of achieving a second outcome when a particular decision (or action plan) is implemented with respect to various customer's with specific characteristics or profiles. In sum, any number of prediction models may be used to predict any number of outcomes under any number of different input attribute values.

The prediction models may be retrieved from (or sent by) one or more pruned prediction models database 310. The interactive servers 302 also may be configured to collect contextual data regarding the input attributes used in the prediction model, as well as the results of the selected interaction or decision path. This contextual data is collected from one or more interactive servers 302 and stored in learning database 304.

Learning and prediction model builder server 306 is generally configured to use the data from learning database 304 to update (the terms update, build, create, or modify are used interchangeably herein) one or more prediction models that are then sent to pruned prediction model repository 310. Additionally, learning and prediction model builder server 306 prunes one or more learning models 308 to generate one or more pruned prediction models, which are stored in pruned prediction model repository 310. A prediction model is generally a learning model whose input attributes have been trimmed down to a subset of attributes (or attribute values) so as to be more efficient. That is, the prediction model will typically have less input attributes to affect its results than the learning model from which it has been pruned. Pruned prediction models are used by the interactive servers 302 to formulate decisions or select particular interaction paths. The learning and prediction model builder server 306 may also be configured to update the one or more learning models if necessary.

Figure 4:
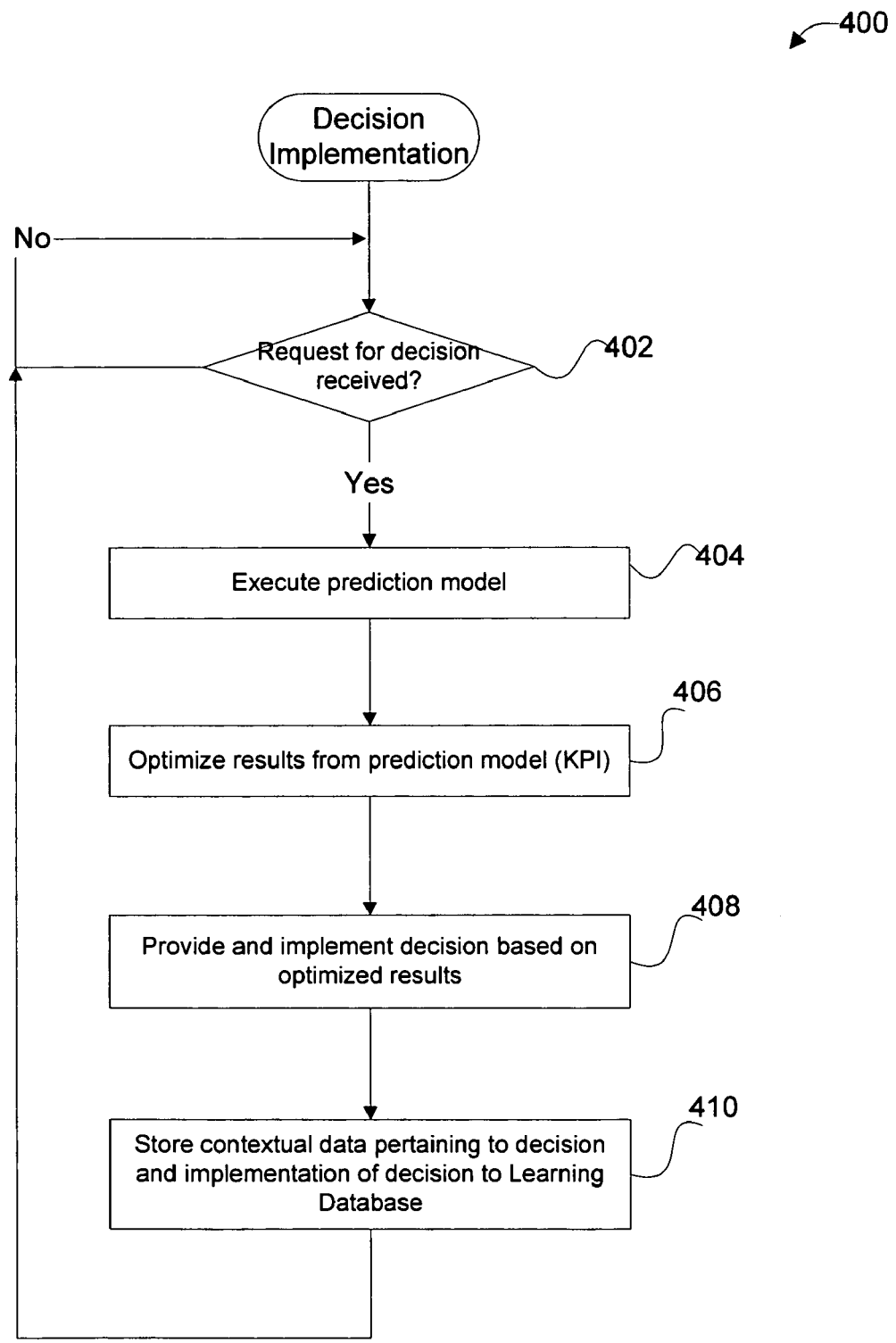
FIG. 4 is a flowchart illustrating a procedure for implementing a decision using an updated prediction model in accordance with one embodiment of the present invention.

FIG. 4 is a flowchart illustrating a procedure 400 for implementing a decision using a prediction model in accordance with one embodiment of the present invention. In the example of FIG. 3, this procedure 400 may be executed on any one of servers 302, for example. Initially, a request for a decision may be received at operation 402. For instance, a customer may access a particular website of a company or call a company's service telephone number. The automatic process that is automatically interacting with the customer may be making a request for a particular decision regarding which web page, automated voice interaction, or particular live sales agent is to be presented to the particular customer. The request may be received at any time during the customer interaction process, e.g., at any web page in a series of sequentially presented web pages or at the beginning or at any intermediary point of an IVR telephone call. The request may also be made by a person, rather than an automatic process. For example, a sales representative may be making requests via a graphical user interface while interacting with a customer through some form of computer data exchange, such as a chat session, or a via a telephone interaction.

One or more prediction models are then executed based on the contextual data or input attributes associated with the particular decision request in operation 404. In a sales type application, the prediction model may produce a probability value for each potential offer being accepted by the customer if such offer is presented to the customer. In one embodiment, the prediction model may also assign values for each of a plurality of key performance indicators ("KPI's") for each of the different decision choices (e.g., presentation of the different offers). In the sales offer example, the prediction model may output a value for a number of factors (or KPI's) that each correspond to how well a particular performance goal is being met when each offer is presented. For instance, the performance goals may include both minimizing cost and maximizing revenue, as well as the probability of the offer being accepted if presented to the customer. In this example, the prediction model may determine that if a particular offer is presented it will result in $50 cost which is reflected in the "minimizing cost" KPI, an expected revenue increase of $90 for the "maximizing revenue" KPI, and a 27% value for the probability of acceptance KPI. A second offer may result in different KPI values if the second offer is presented.

The KPI values for each decision (e.g., a particular offer is presented) may then be compared in an optimization operation 406. For example, it is determined which decision to implement based on the relative importance of the various KPI's of the decisions. Several suitable embodiments of optimization techniques are described in concurrently filed U.S. patent application Ser. No. 10/980,440, entitled "Method and Apparatus for Optimizing the Results Produced by a Prediction Model" by Michel Adar et al., which application is incorporated by reference herein in its entirety for all purposes.

The selected decision is then provided and implemented based on the optimized results in operation 408. For example, the selected offer is presented to the customer. The contextual data (e.g., input attributes and results of the decision) are then stored, for example, in the learning database 304 in operation 410. Any suitable input attributes that are likely to affect the outcome of the prediction model are retained. In the sales example, a customer's demographics, sales history, and specifics of their interactions with the sales center may be retained as contextual data. After the contextual data is stored, the decision implementation procedure 400 may then be repeated for the next decision request.

Figure 5:
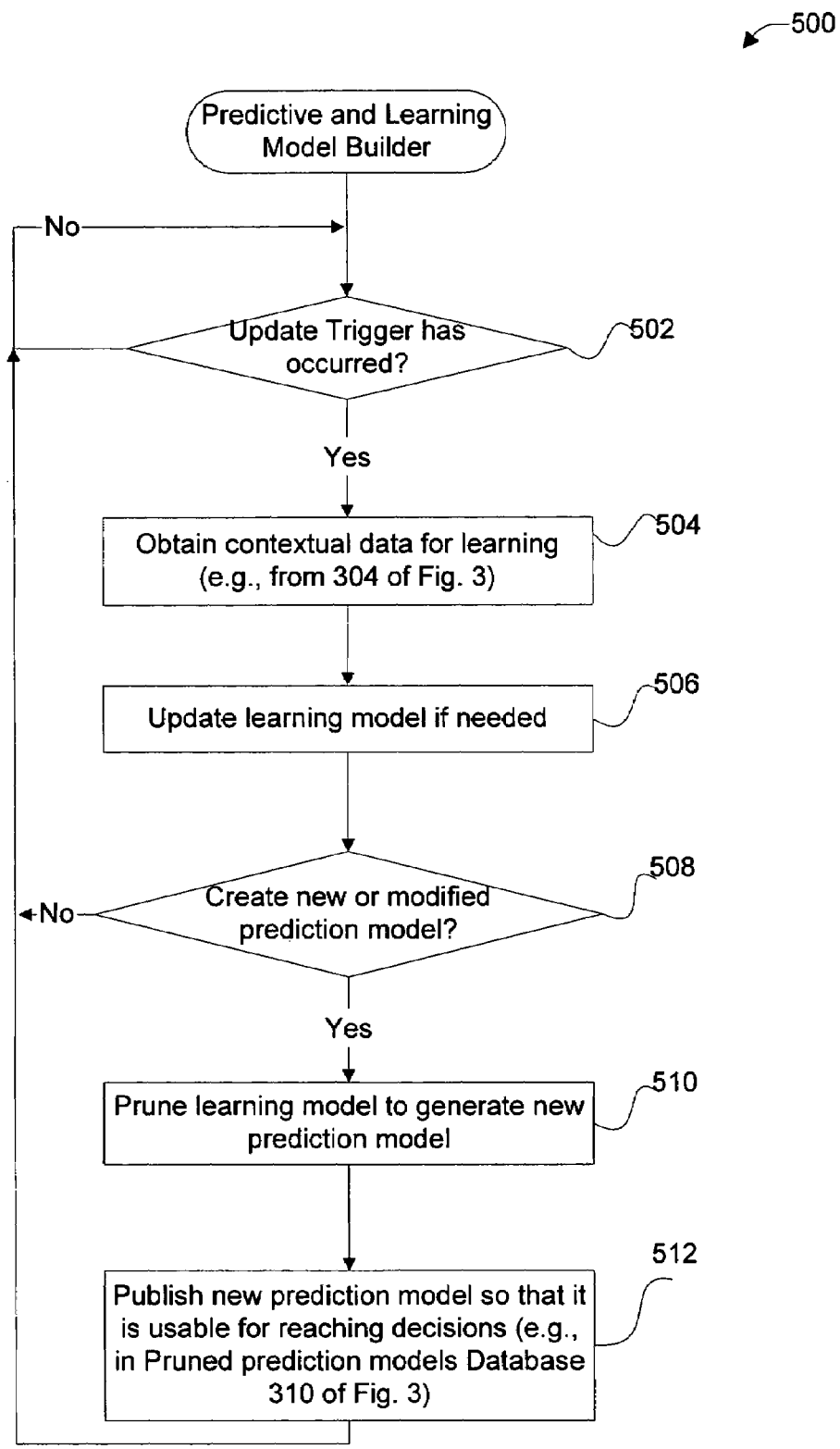
FIG. 5 is a flowchart illustrating a procedure for building a learning or prediction model in accordance with one embodiment of the present invention.

FIG. 5 is a flowchart illustrating a procedure 500 for building a learning or prediction model in accordance with one embodiment of the present invention. For example, this procedure 500 may be implemented within the learning and prediction model builder server 306 of FIG. 3. It should be noted that if a single interactive server 302 is used, the learning and prediction model builder server 306 (and/or the other components of FIG. 3) may all be implemented within the single interactive server 302. However, a distributed system 300 for efficiently and reliably handling a large number of interactions as illustrated in FIG. 3 is preferred.

Referring back to FIG. 5, it is first determined whether an "update trigger" has occurred in operation 502. An update trigger may be any suitable event that results in the learning and/or prediction models being continuously updated in-line, e.g., while interactions that require decisions are being performed. By way of examples, the update trigger may occur when it is determined that a particular level of contextual data has been collected, a certain number of decisions or interactions have been implemented, a threshold for servicing clients through a sales center has been reached, a predetermined time period has expired, the number of new input attributes from the collected contextual data has reached a predetermined percentage of a total number of the input attributes or a predetermined minimum number of new input attributes has been reached, etc. In general, the one or more prediction models which are available to the interactive servers are updated in a consistent, continuing manner.

If an update trigger has not occurred, the model builder process 500 simply waits for an update trigger. When an update trigger occurs, contextual data is then obtained for learning at operation 504. Alternatively, this operation may be performed prior to the trigger determination operation 502. In the example of FIG. 3, contextual data is deposited in the learning database 304 by interactive servers 302 as they interact or implement decisions with various user entities. Alternatively, the contextual data may be pulled from the interactive servers 302 by another processing device or the learning database 304 itself and deposited in the learning database 304.

The learning model is updated if necessary in operation 506. When a learning system such as the system 300 of FIG. 3 is initially set up, it may be preconfigured with a one or more learning models 308. Each learning model generally tracks the relationships between the input attributes for various user entities and the results from implementing one or more decisions. The input attributes as well as the decisions are each a finite set. The input attributes are selected as possibly being relevant to affecting any of the prediction targets, such as predicting the probability of selling a red car to a specific type of customer. The learning model will track what happens with respect to prediction targets when particular input attribute values are present and use this information to determine probabilities of achieving specific goals when specific input attribute values are present. Techniques for determining probability values for achieving specific goals under various input attribute conditions are well known to those skilled in the art. For example, several data mining techniques may be found in the textbook "Predictive Data Mining: A Practical Guide" by Sholom M. Weiss and Nitin Indurkhya, Published by Morgan Kaufmann (Aug. 1, 1997), ISBN: 1558604030, which text is incorporated herein by reference in its entirety for all purposes.

A learning model (as well as prediction model) keeps track of a plurality of counts of specific input attribute values (or combination of attribute values) for each of the prediction targets. For example, a count of the number of customers that are from California (one possible value of the "residential state" input attribute) who have purchased a red car (a particular prediction target) is retained. These counts are then used to predict probability of such goals being met under various input attribute conditions when the collected data is enough to render the predictions to be statistically significant. Additionally, the outcomes of the learning (and predictive) model may change over time as more data is collected.

Referring back to FIG. 5, it is then determined whether a new or modified prediction model is needed in operation 508. That is, a new prediction model may be generated when a particular amount of data has been collected or after a particular time period. If a new or modified prediction model is required, the learning model is pruned to remove any unnecessary input attributes to form a prediction model in operation 510. The pruned prediction model is then published so that it is useable by decision making entities, such as the interactive servers 302 of FIG. 3. In one embodiment, the prediction model is placed in the prediction model database 310 of FIG. 3. The process 500 then repeats at operation 502. Similarly, if a new prediction model is not necessary, the process 500 also goes back to operation 502.

Figure 6:
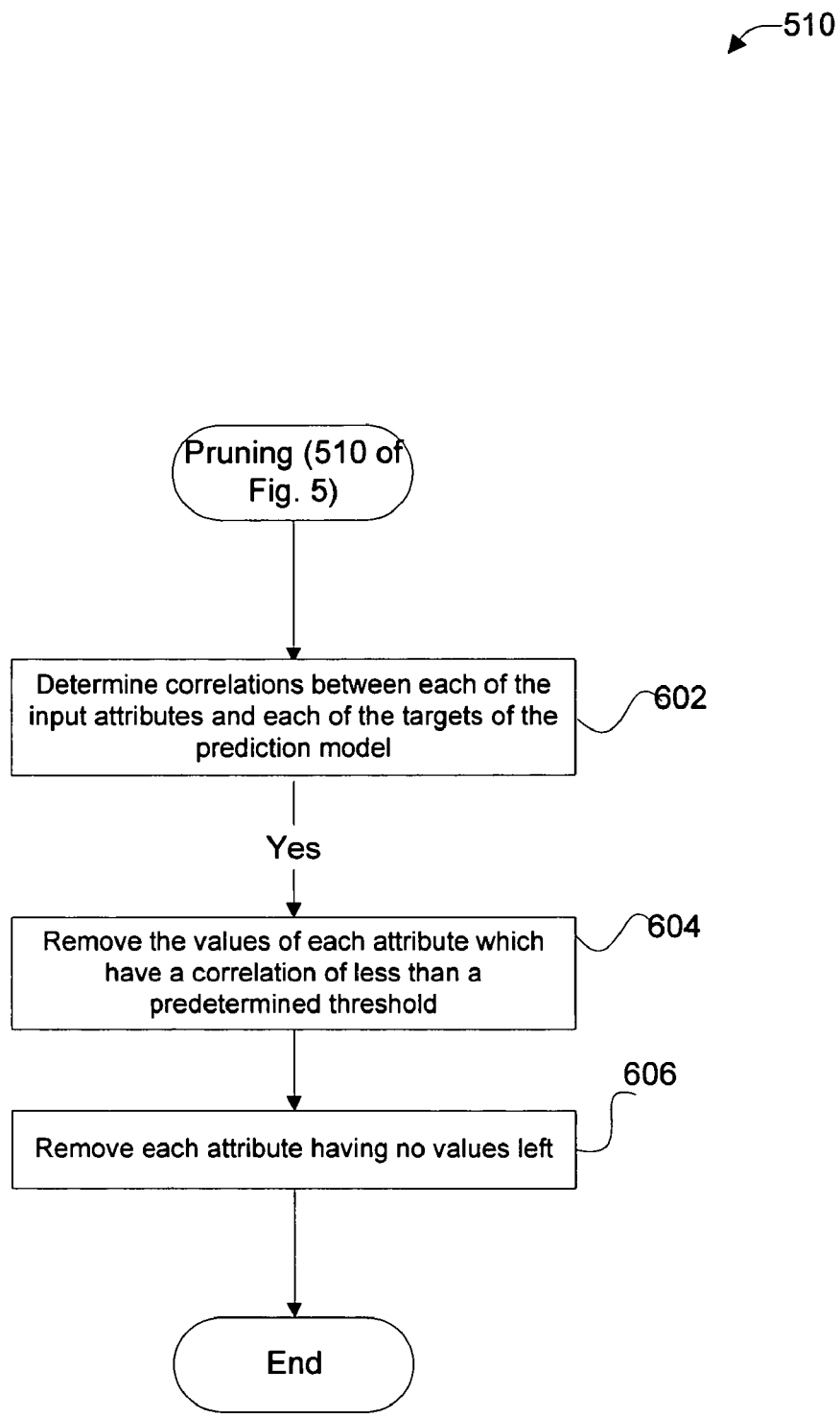
FIG. 6 is a flowchart illustrating the model pruning process of FIG. 5 in accordance with a specific implementation of the present invention.

FIG. 6 is a flowchart illustrating the model pruning process 510 of FIG. 5 in accordance with a specific implementation of the present invention. Initially, correlations between each of the input attributes and each of the targets of the prediction model are calculated in operation 602. Individual values of an attribute having correlations less than a threshold are removed in operation 604. Attributes below this threshold have little effect on the prediction model and are therefore extraneous. Attributes which have no values left are then removed as input to the particular prediction model, and the pruning procedure 510 ends.

In general, attributes which do not distinguish between different outcomes of implementing decisions or events are not used. For example, a particular attribute may be a customer's state of residence. If a third of the customers that buy a particular item such as a "red car" are from California, a third are from Nevada, and a third are from Oregon and these three states are all the states for which there is data and there are a same number of customers in each state, it is determined that the "customer state" attribute does not contribute to the prediction of whether a particular customer from a particular state is likely to buy a red car. If the only target of prediction is the likelihood of whether a customer will buy a red car, then the attribute for state may be removed completely. Otherwise, if this attribute significantly affects other prediction targets, then it is retained. In another example, an input attribute "customer state" may have 50 possible values (e.g., the 50 states of the United States). If 30 of the states produce an average likelihood of buying a red car while the remaining 20 states have a higher or lower than average likelihood, then these non-average 20 states may be retained while the average likelihood states may be eliminated from being used in the prediction model. In this later case, the attribute itself is not eliminated, but only some of its values.

By way of another example application, it may be determined that people in a certain income bracket are most likely to ask for a bank balance during interactions with a bank's service center. It may be determined that presenting this type of person with their balance is likely to achieve a relatively high increase in the customer satisfaction level, which may be an important business goal. It may also be found that the likelihood of different people from different states asking for a bank balance is relatively equal in value. Thus, a person's state of residence may be excluded from the prediction model for determining the likelihood of a person asking for their bank balance.

The present invention may employ various computer-implemented operations involving information stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms such as, producing, identifying, running, determining, comparing, executing, downloading, or detecting. It is sometimes convenient, principally for reasons of common usage, to refer to these electrical or magnetic signals as bits, values, elements, variables, characters, or the like. It should be remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 7:
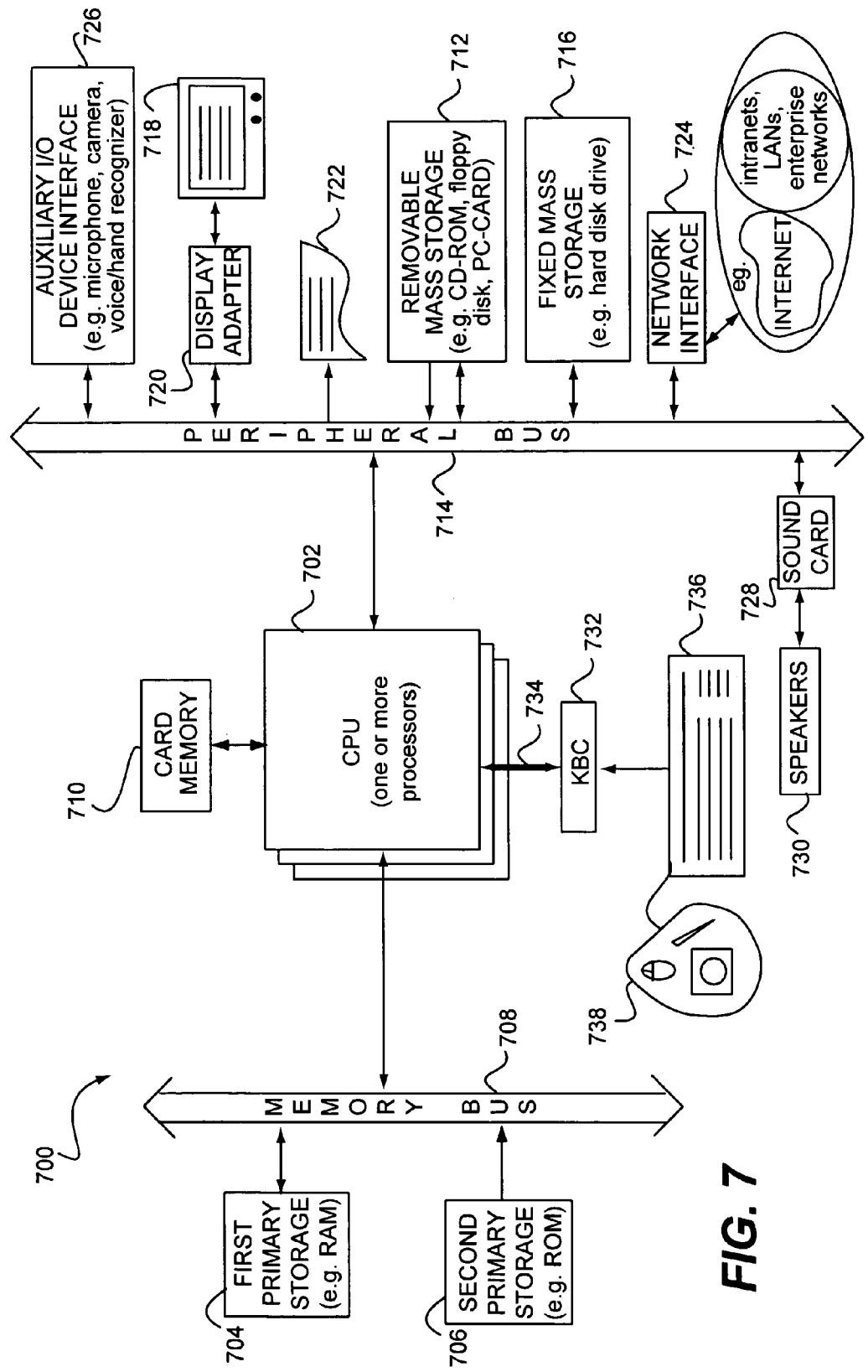
FIG. 7 is a block diagram of a general purpose computer system suitable for carrying out the processing in accordance with one embodiment of the present invention.

FIG. 7 is a block diagram of a general purpose computer system 700 suitable for carrying out the processing in accordance with one embodiment of the present invention. Other computer system architectures and configurations can be used for carrying out the processing of the present invention. Computer system 700, made up of various subsystems described below, includes at least one microprocessor subsystem (also referred to as a central processing unit, or CPU) 702. That is, CPU 702 can be implemented by a single-chip processor or by multiple processors. CPU 702 is a general purpose digital processor which controls the operation of the computer system 700. Using instructions retrieved from memory, the CPU 702 controls the reception and manipulation of input information, and the output and display of information on output devices.

CPU 702 is coupled bi-directionally with a first primary storage 704, typically a random access memory (RAM), and uni-directionally with a second primary storage area 706, typically a read-only memory (ROM), via a memory bus 708. As is well known in the art, primary storage 704 can be used as a general storage area and as scratch-pad memory, and can also be used to store input data and processed data. It can also store programming instructions and data, in addition to other data and instructions for processes operating on CPU 702, and is typically used for fast transfer of data and instructions bi-directionally over memory bus 708. Also, as is well known in the art, primary storage 706 typically includes basic operating instructions, program code, data and objects used by the CPU 702 to perform its functions. Primary storage devices 704 and 706 may include any suitable computer-readable storage media, described below, depending on whether, for example, data access needs to be bi-directional or uni-directional. CPU 702 can also directly and very rapidly retrieve and store frequently needed data in a cache memory 710.

A removable mass storage device 712 provides additional data storage capacity for the computer system 700, and is coupled either bi-directionally or uni-directionally to CPU 702 via a peripheral bus 714. For example, a specific removable mass storage device commonly known as a CD-ROM typically passes data uni-directionally to the CPU 702, whereas a floppy disk can pass data bi-directionally to the CPU 702. Storage 712 may also include computer-readable media such as magnetic tape, flash memory, signals embodied in a carrier wave, Smart Cards, portable mass storage devices, and other storage devices. A fixed mass storage 716 also provides additional data storage capacity and is coupled bi-directionally to CPU 702 via peripheral bus 714. Generally, access to these media is slower than access to primary storages 704 and 706. Mass storage 712 and 716 generally store additional programming instructions, data, and the like that typically are not in active use by the CPU 702. It will be appreciated that the information retained within mass storage 712 and 716 may be incorporated, if needed, in standard fashion as part of primary storage 704 (e.g. RAM) as virtual memory.

In addition to providing CPU 702 access to storage subsystems, the peripheral bus 714 is used to provide access to other subsystems and devices as well. In the described embodiment, these include a display monitor 718 and adapter 720, a printer device 722, a network interface 724, an auxiliary input/output device interface 726, a sound card 728 and speakers 730, and other subsystems as needed.

The network interface 724 allows CPU 702 to be coupled to another computer, computer network, or telecommunications network using a network connection as referred to. Through the network interface 724, it is contemplated that the CPU 702 might receive information, e.g., objects, program instructions, or bytecode instructions from a computer in another network, or might output information to a computer in another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 702 can be used to connect the computer system 700 to an external network and transfer data according to standard protocols. That is, method embodiments of the present invention may execute solely upon CPU 702, or may be performed across a network such as the Internet, intranet networks, or local area networks, in conjunction with a remote CPU that shares a portion of the processing. Additional mass storage devices (not shown) may also be connected to CPU 702 through network interface 724.

Auxiliary I/O device interface 726 represents general and customized interfaces that allow the CPU 702 to send and, more typically, receive data from other devices. Also coupled to the CPU 702 is a keyboard controller 732 via a local bus 734 for receiving input from a keyboard 736 or a pointer device 738, and sending decoded symbols from the keyboard 736 or pointer device 738 to the CPU 702. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs). The computer-readable medium can also be distributed as a data signal embodied in a carrier wave over a network of coupled computer systems so that the computer-readable code is stored and executed in a distributed fashion.

It will be appreciated by those skilled in the art that the above described hardware and software elements are of standard design and construction. Other computer systems suitable for use with the invention may include additional or fewer subsystems. In addition, memory bus 708, peripheral bus 714, and local bus 734 are illustrative of any interconnection scheme serving to link the subsystems. For example, a local bus could be used to connect the CPU to fixed mass storage 716 and display adapter 720. The computer system referred to in FIG. 7 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For instance, the following claims often use the article "a" or "an" and use of such article does not limit the claim scope to a single element. Therefore, the described embodiments should be taken as illustrative and not restrictive, and the invention should not be limited to the details given herein but should be defined by the following claims and their full scope of equivalents.

What is claimed is:

1. A computer-implemented method of updating at least one prediction model for use by at least one interactive server, wherein each interactive server performs a plurality of actions in the context of a plurality of input attribute values of an input dataset and wherein the actions are selected based on each prediction model, the method comprising:

(a) automatically and continually obtaining contextual data from the interactive server as it performs the plurality of actions, wherein the contextual data indicates at least which action was performed, which input attribute values are present for each action that was performed, and which outcome is achieved for each action was performed;

(b) automatically and continually updating a learning model based on all of the obtained contextual data, wherein the learning model predicts a probability of each of a plurality of specific outcomes occurring for each of a plurality of specific actions being performed by the interactive server when specific combinations of one or more input attribute values are present, wherein the updating of the learning model is based on counts of each attribute value as it is present along with each of the other attribute values;

(c) generating an updated prediction model, wherein generating comprises,
    determining a correlation between one or more values of input attributes and a target of prediction,
    comparing the correlation with a threshold,
    eliminating each value of input attributes from the input dataset if the value of input attribute falls to satisfy the threshold, and
    in response to eliminating, generating the updated prediction model based on the input dataset;
(d) generating a prediction of a probability of an outcome using the updated prediction model;
(e) selecting an action of the plurality of actions based on the prediction; and
(f) performing the action,
    wherein operations (b) and (c) are performed each time a condition is met, the condition being selected from a group consisting of (i) a predetermined level of contextual data has been obtained, (ii) a predetermined number of actions have been performed, (iii) a predetermined time period has expired, and (iv) a number of new input attributes from the collected contextual data has reached a predetermined percentage of a total number of the input attributes or a predetermined minimum number of new input attributes has been reached.

2. A method as recited in claim 1, wherein the contextual data is obtained from each of a plurality of interactive servers by a centralized model building server, wherein the learning model is updated by the centralized model building server to update the prediction model so that it is usable by any of the distributed interactive servers.

3. A method as recited in claim 1, wherein operations (a) through (c) are performed unsupervised without human intervention.

4. A method as recited in claim 1, wherein the input attribute values identify one or more attributes of a plurality of contacting entities, one or more attributes of a plurality of answering entities, and time information regarding when specific interactions occur with respect to contacting entities and answering entities.

5. A method as recited in claim 4, wherein the contacting entities are potential or current customers and the answering entities are sales or service agents in communication with the potential or current customers.

6. A method as recited in claim 5, wherein the interactive server is a web server and the sales or service agents include automated agents.

7. A method as recited in claim 5, wherein the learning model and the prediction model are both updated to predict a probability of whether a particular product will be purchased when a specific offer is presented via one or more web pages to a potential customer having a particular attribute profile.

8. A method as recited in claim 7, wherein the learning model and the prediction models are both updated to predict a plurality of probabilities with respect to a plurality of products, a plurality of offers, and a plurality of attribute profiles.

9. A method as recited in claim 5, wherein the interactive server is part of a telephone service center.

10. A method as recited in claim 9, wherein the telephone service center implements interactive voice recognition (IVR) type actions.

11. A method as recited in claim 5, wherein the learning model and the prediction model are both updated to predict a probability of whether a particular service option will be selected by a customer having a particular attribute profile when such particular service option is presented to such customer.

12. A method as recited in claim 11, wherein the learning model and the prediction models are both updated to predict a plurality of probabilities with respect to a plurality of service options and a plurality of attribute profiles.

13. A method as recited in claim 1, wherein a plurality of learning models are updated to form a plurality of updated prediction models that are usable by the interactive server to implement actions.

14. A method as recited in claim 1, further comprising publishing the prediction model to the interactive server.

15. A computer system updates at least one prediction model for use by at least one interactive server, wherein each interactive server performs a plurality of actions in the context of a plurality of input attribute values of an input dataset and wherein the actions are selected based on each prediction model, the computer system comprising:
    a processor; and
    a memory coupled to the processor, the memory stores a plurality of code modules which when executed by the processor cause the processor to:
    (a) automatically and continually obtaining contextual data from the interactive server as it performs the plurality of actions, wherein the contextual data indicates at least which action was performed, which input attribute values are present for each action that was performed, and which outcome is achieved for each action was performed;
    (b) automatically and continually updating a learning model based on all of the obtained contextual data, wherein the learning model predicts a probability of each of a plurality of specific outcomes occurring for each of a plurality of specific actions being performed by the interactive server when specific combinations of one or more input attribute values are present, wherein the updating of the learning model is based on counts of each attribute value as it is present along with each of the other attribute values;
    (c) generating an updated prediction model, wherein generating comprises,
        determining a correlation between one or more values of input attributes and a target of prediction,
        comparing the correlation with a threshold,
        eliminating each value of input attributes from the input dataset if the value of input attribute falls to satisfy the threshold, and
        in response to eliminating, generating the updated prediction model based on the input dataset;
    (d), generating a prediction of a probability of an outcome using the updated prediction model;
    (e) selecting an action of the plurality of actions based on the prediction; and
    (f) performing the action,
    wherein operations (b) and (c) are performed each time a condition is met, the condition being selected from a group consisting of (i) a predetermined level of contextual data has been obtained, (ii) a predetermined number of actions have been performed,(iii) a predetermine time period has expired, and (iv) a number of new input attributes from the collected contextual data has reached a predetermined percentage of a total number input attributes or a predetermined minimum number of new intuit attributes has been reached.

16. A computer system as recited in claim 15, wherein the contextual data is obtained from each of a plurality of interactive servers by a centralized model building server, wherein the learning model is updated by the centralized model building server to update the prediction model so that it is usable by any of the distributed interactive servers.

17. A computer system as recited in claim 15, wherein operations (a) through (c) are performed unsupervised without human intervention.

18. A computer system as recited in claim 15, wherein the input attribute values identify one or more attributes of a plurality of contacting entities, one or more attributes of a plurality of answering entities, and time information regarding when specific interactions occur with respect to contacting entities and answering entities, and wherein the updating of the learning model is based on counts of each attribute value as it is present along with each of the other attribute values.

19. A computer system as recited in claim 18, wherein the contacting entities are potential or current customers and the answering entities are sales or service agents in communication with the potential or current customers.

20. A computer system as recited in claim 19, wherein the interactive server is a web server and the sales or service agents include automated agents.

21. A computer system as recited in claim 19, wherein the learning model and the prediction model are both updated to predict a probability of whether a particular product will be purchased when a specific offer is presented via one or more web pages to a potential customer having a particular attribute profile.

22. A computer system as recited in claim 21, wherein the learning model and the prediction models are both updated to predict a plurality of probabilities with respect to a plurality of products, a plurality of offers, and a plurality of attribute profiles.

23. A computer system as recited in claim 19, wherein the interactive server is part of a telephone service center.

24. A computer system as recited in claim 23, wherein the telephone service center implements interactive voice recognition (IVR) type actions.

25. A computer system as recited in claim 19, wherein the learning model and the prediction model are both updated to predict a probability of whether a particular service option will be selected by a customer having a particular attribute profile when such particular service option is presented to such customer.

26. A computer system as recited in claim 25, wherein the learning model and the prediction models are both updated to predict a plurality of probabilities with respect to a plurality of service options and a plurality of attribute profiles.

27. A computer system as recited in claim 15, wherein a plurality of learning models are updated to form a plurality of updated prediction models that are usable by the interactive server to implement actions.

28. A computer system as recited in claim 15, wherein at least one of the processors and memory are further adapted for publishing the prediction model to the interactive server.

29. A computer program product embedded in a computer memory for updating at least one prediction model for use by at least one interactive server, wherein each interactive server performs a plurality of actions in the context of a plurality of input attribute values of an input dataset and wherein the actions are selected based on each prediction model, the computer program product comprising:

(a) code for automatically and continually obtaining contextual data from the interactive server as it performs the plurality of actions, wherein the contextual data indicates at least which action was performed, which input attribute values are present for each action that was performed, and which outcome is achieved for each action was performed;

(b) code for automatically and continually updating a learning model based on all of the obtained contextual data, wherein the learning model predicts a probability of each of a plurality of specific outcomes occurring for each of a plurality of specific actions being performed by the interactive server when specific combinations of one or more input attribute values are present, wherein the updating of the learning model is based on counts of each attribute value as it is present along with each of the other attribute values;

(c) code for generating an updated prediction model, wherein generating comprises,
  determining a correlation between one or more values of input attributes and a target of prediction,
  comparing the correlation with a threshold,
  eliminating each value of input attributes from the input dataset if the value of input attribute fails to satisfy the threshold, and
  in response to eliminating, generating the updated prediction model based on the input dataset;

(d) code for generating a prediction of a probability of an outcome using the updated prediction model;

(e) code for selecting an action of the plurality of actions based on the prediction; and (f) code for performing the action, wherein operations (b) and (c) are performed each time condition is met, the condition being selected from a group consisting of (i) a predetermined level of contextual data has been obtained, (ii) a predetermined number of actions have been performed, (iii) a predetermine time period has expired, and (iv) a number of new input attributes from the collected contextual data has reached a predetermined percentage of a total number of the attributes or a predetermined minimum number of new input attributes has been reached.

30. A computer program product as recited in claim 29, wherein the contextual data is obtained from each of a plurality of interactive servers by a centralized model building server, wherein the learning model is updated by the centralized model building server to update the prediction model so that it is usable by any of the distributed interactive servers.

31. A computer program product as recited in claim 29, wherein operations (a) through (c) are performed unsupervised without human intervention.

32. A computer program product as recited in claim 29, wherein the input attribute values identify one or more attributes of a plurality of contacting entities, one or more attributes of a plurality of answering entities, and time information regarding when specific interactions occur with respect to contacting entities and answering entities, and wherein the updating of the learning model is based on counts of each attribute value as it is present along with each of the other attribute values.

33. A computer program product as recited in claim 32, wherein the contacting entities are potential or current customers and the answering entities are sales or service agents in communication with the potential or current customers.

34. A computer program product as recited in claim 33, wherein the interactive server is a web server and the sales or service agents include automated agents.

35. A computer program product as recited in claim 33, wherein the learning model and the prediction model are both updated to predict a probability of whether a particular product will be purchased when a specific offer is presented via one or more web pages to a potential customer having a particular attribute profile.

36. A computer program product as recited in claim 35, wherein the learning model and the prediction models are both updated to predict a plurality of probabilities with respect to a plurality of products, a plurality of offers, and a plurality of attribute profiles.

37. A computer program product as recited in claim 33, wherein the interactive server is part of a telephone service center.

38. A computer program product as recited in claim 37, wherein the telephone service center implements interactive voice recognition (IVR) type actions.

39. A computer program product as recited in claim 33, wherein the learning model and the prediction model are both updated to predict a probability of whether a particular service option will be selected by a customer having a particular attribute profile when such particular service option is presented to such customer.

40. A computer program product as recited in claim 39, wherein the learning model and the prediction models are both updated to predict a plurality of probabilities with respect to a plurality of service options and a plurality of attribute profiles.

41. A computer program product as recited in claim 29, wherein a plurality of learning models are updated to form a plurality of updated prediction models that are usable by the interactive server to implement actions.

42. A computer program product as recited in claim 29, further comprising code for publishing the prediction model to the interactive server.

43. An apparatus for updating at least one prediction model for use by at least one interactive server, wherein each interactive server performs a plurality of actions in the context of a plurality of input attribute values of an input dataset and wherein the actions are selected based on each prediction model, comprising:

means for (a) automatically and continually obtaining contextual data from the interactive server as it performs the plurality of actions, wherein the contextual data indicates at least which action was performed, which input attribute values are present for each action that was performed, and which outcome is achieved for each action was performed;

means for (b) automatically and continually updating a learning model based on all of the obtained contextual data, wherein the learning model is configured to predict a probability of each of a plurality of specific outcomes occurring for each of a plurality of specific actions being performed by the interactive server when specific combinations of one or more input attribute values are present, wherein the updating of the learning model is based on counts of each attribute value as it is present along with each of the other attribute values;

means for (c) generating an updated prediction model, wherein generating comprises,
  determining a correlation between one or more values of input attributes and a target of prediction,
  comparing the correlation with a threshold,
  eliminating each value of input attributes from the input dataset if the value of input attribute fails to satisfy the threshold, and
  in response to eliminating, generating the updated prediction model based on the input dataset;

means for (d) generating a prediction of a probability of an outcome using the updated prediction model;

means for (e) selecting an action of the plurality of actions based on the prediction; and means for (f) performing the action, wherein operations (b) and (c) are performed each time a condition is met, the condition being selected from a group consisting of (i) a predetermined level of contextual data has been obtained, (ii) a predetermined number of actions have been performed, (iii) a predetermined time period has expired, and (iv) a number of new input attributes from the collected contextual data has reached a predetermined percentage of a total number of the input attributes or a predetermined minimum number of new input attributes has been reached.

* * * * *

UNITED STATES PATENT AND TRADEMARK OFFICE
CERTIFICATE OF CORRECTION

PATENT NO. : 7,519,566 B2  Page 1 of 2
APPLICATION NO. : 10/980421
DATED : April 14, 2009
INVENTOR(S) : Prigogin et al.

It is certified that error appears in the above-identified patent and that said Letters Patent is hereby corrected as shown below:

On face page, in field (57), in column 2, under "Abstract", line 4, delete "attributes" and insert -- attribute --, therefor.

On face page, in field (57), in column 2, under "Abstract", line 6, delete "contextual" and insert -- Contextual --, therefor.

On face page, in field (57), in column 2, under "Abstract", line 14, delete "selection" and insert -- selected --, therefor.

In column 3, line 60, delete "value," and insert -- value --, therefor.

In column 6, line 18, after "302(b)," insert -- and --.

In column 6, line 23, delete "servers302" and insert -- servers 302 --, therefor.

In column 6, line 35, delete "input" and insert -- Input --, therefor.

In column 7, line 18, delete "procedure400" and insert -- procedure 400 --, therefor.

In column 13, line 7, in claim 1, delete "falls" and insert -- fails --, therefor.

In column 13, line 54, in claim 8, delete "models" and insert -- model --, therefor.

In column 14, line 2, in claim 12, delete "models" and insert -- model --, therefor.

In column 14, line 45, in claim 15, delete "falls" and insert -- fails --, therefor.

In column 14, line 49, in claim 15, delete "(d)," and insert -- (d) --, therefor.

In column 14, line 58, in claim 15, delete "performed,(iii)" and insert -- performed, (iii) --, therefor.

Signed and Sealed this

Eighth Day of June, 2010

David J. Kappos
*Director of the United States Patent and Trademark Office*

In column 14, line 61, in claim 15, after "number" insert -- of the --.

In column 14, line 63, in claim 15, delete "intuit" and insert -- input --, therefor.

In column 16, line 30, in claim 29, after "time" insert -- a --.